(12) United States Patent
Zhang et al.

(10) Patent No.: US 10,069,818 B2
(45) Date of Patent: Sep. 4, 2018

(54) METHOD, SYSTEM, DEVICE, AND TERMINAL FOR NETWORK INITIALIZATION OF MULTIMEDIA PLAYBACK DEVICE

(71) Applicant: TENCENT TECHNOLOGY (SHENZHEN) COMPANY LIMITED, Shenzhen (CN)

(72) Inventors: Yun Zhang, Shenzhen (CN); Jing Li, Shenzhen (CN); Peng Hu, Shenzhen (CN); Zhenrong Ye, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 270 days.

(21) Appl. No.: 14/976,042

(22) Filed: Dec. 21, 2015

(65) Prior Publication Data

US 2016/0105418 A1    Apr. 14, 2016

Related U.S. Application Data

(63) Continuation of application No. PCT/CN2014/083263, filed on Jul. 29, 2014.

(30) Foreign Application Priority Data

Sep. 3, 2013    (CN) .......................... 2013 1 0395286

(51) Int. Cl.
*H04L 29/06*    (2006.01)
*H04W 48/08*    (2009.01)
(Continued)

(52) U.S. Cl.
CPC ........ *H04L 63/083* (2013.01); *H04L 65/1069* (2013.01); *H04W 12/06* (2013.01);
(Continued)

(58) Field of Classification Search
CPC .. H04L 63/083; H04L 65/1069; H04W 12/06; H04W 48/08; H04W 76/02
See application file for complete search history.

(56) References Cited

U.S. PATENT DOCUMENTS

2005/0101293 A1* 5/2005 Mentze ............... H04L 63/0428
                                                                 455/410
2005/0149757 A1* 7/2005 Corbett .................. H04L 63/02
                                                                 726/4
(Continued)

FOREIGN PATENT DOCUMENTS

CN      101668290 A       3/2010
CN      102802071 A      11/2012
(Continued)

OTHER PUBLICATIONS

Ghini et al., "Enhancing Mobile E-Witness with Access Point Selection Policies", Apr. 2008, Fifth International Conference on Information Technology: New Generations, pp. 372-377 (Year: 2008).*

(Continued)

*Primary Examiner* — Kenneth W Chang
(74) *Attorney, Agent, or Firm* — Anova Law Group, PLLC

(57) ABSTRACT

The present disclosure provides a method, system, device, and terminal for network initialization of a multimedia playback device. The method includes: screening, by a terminal, a wireless access point of the multimedia playback device; connecting the terminal to a first wireless network of the wireless access point of the multimedia playback device; and sending, by the terminal, parameter information of a second wireless network, to which the terminal connects, to the multimedia playback device through the first wireless network, which allows the multimedia playback device to be connected to the second wireless network according to the (Continued)

parameter information of the second wireless network, so as to complete initialization. The method for network initialization of a multimedia playback device does not need to download a specific application to perform multistep network initialization nor to input a series of IP addresses through a network browser and make complicated settings to perform network initialization. Implementation of the process of the network initialization herein is simple, convenient to use, and highly efficient.

14 Claims, 5 Drawing Sheets

(51) Int. Cl.
*H04W 12/06* (2009.01)
*H04W 88/02* (2009.01)
*H04W 88/08* (2009.01)
*H04W 84/12* (2009.01)

(52) U.S. Cl.
CPC ............ *H04W 48/08* (2013.01); *H04W 84/12* (2013.01); *H04W 88/02* (2013.01); *H04W 88/08* (2013.01)

(56) References Cited

U.S. PATENT DOCUMENTS

| | | | | |
|---|---|---|---|---|
| 2006/0135206 | A1* | 6/2006 | Louks | H04L 63/18 455/557 |
| 2007/0140189 | A1* | 6/2007 | Muhamed | H04W 48/14 370/338 |
| 2009/0224906 | A1* | 9/2009 | Balgard | H04L 41/0809 340/539.1 |
| 2009/0245176 | A1* | 10/2009 | Balasubramanian | H04W 48/20 370/328 |
| 2010/0110993 | A1* | 5/2010 | Jain | H04W 88/06 370/328 |
| 2011/0317661 | A1* | 12/2011 | Tenny | H04W 36/0022 370/331 |
| 2013/0094441 | A1* | 4/2013 | Milner | H04W 4/001 370/328 |

FOREIGN PATENT DOCUMENTS

| | | |
|---|---|---|
| CN | 103037477 A | 4/2013 |
| CN | 103069878 A | 4/2013 |
| CN | 103096420 A | 5/2013 |
| CN | 103118419 A | 5/2013 |

OTHER PUBLICATIONS

The World Intellectual Property Organization (WIPO) International Search Report for PCT/CN2014/083263 dated Nov. 4, 2014.
The State Intellectual Property Office of the People's Republic of China (SIPO) Office Action 1 for 201310395286.3 dated Aug. 31, 2015.
The State Intellectual Property Office of the People's Republic of China (SIPO) Office Action 2 for 201310395286.3 dated Nov. 30, 2015.

* cited by examiner

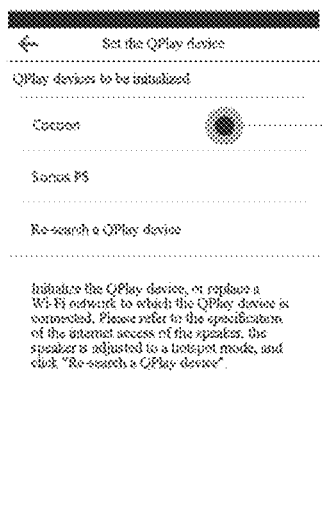
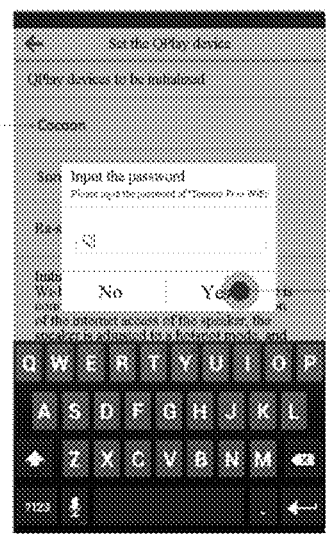
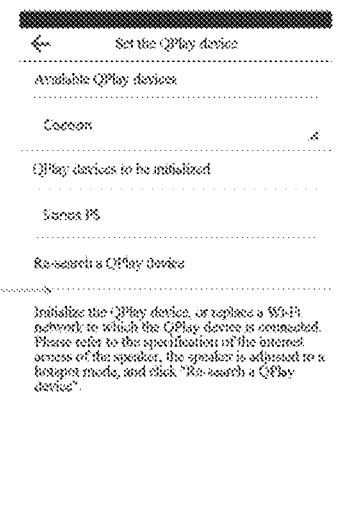
FIG. 4A
FIG. 4B
FIG. 4C

METHOD, SYSTEM, DEVICE, AND TERMINAL FOR NETWORK INITIALIZATION OF MULTIMEDIA PLAYBACK DEVICE

RELATED APPLICATION

This application is a continuation of PCT Patent Application No. PCT/CN2014/083263, filed on Jul. 29, 2014, which claims priority of Chinese Patent Application No. 201310395286.3, filed on Sep. 3, 2013, the entire contents of all of which are incorporated by reference herein.

FIELD OF THE TECHNOLOGY

The subject matter disclosed in the present disclosure relates to the technical field of multimedia playback devices, and in particular, to a method, system, device and terminal for network initialization of a multimedia playback device.

BACKGROUND OF THE DISCLOSURE

With the continuous pursue of better quality of user experience, there are increasing new demands for smart appliances. Further, many types of multimedia playback devices may be configured to play multimedia files. These include TVs, wireless smart speakers and so on.

In the existing technology, a multimedia playback device can be connected to a wireless network through a WiFi network. When a user wants to play a multimedia file through the multimedia playback device, the multimedia file to be played is wirelessly pushed to the multimedia playback device that has been connected to the wireless network, and remote playback of the multimedia file on the multimedia playback device can be achieved. The multimedia playback device in the existing technology can perform network initialization. For example, the multimedia playback device may perform multistep network initialization on the multimedia playback device by downloading a particular application program. This method requires the user to download a particular application and make complicated settings. Another method may require a user to input Internet Protocol (IP) addresses through a network browser, enter a setting interface, select a WiFi network and input the password. This method requires the user to input a series of IP addresses and complete complicated set ups.

Thus, in the existing technology, the settings for the multimedia playback device to perform network initialization are quite cumbersome, and use thereof is inconvenient.

SUMMARY

In order to solve the problems in the existing technology, embodiments of the present disclosure provide a method, system, device, and terminal for network initialization of a multimedia playback device.

One aspect of the present disclosure provides a method for network initialization of a multimedia playback device. The method includes screening, by a terminal, a wireless access point of the multimedia playback device; connecting the terminal to a first wireless network of the wireless access point of the multimedia playback device; sending, by the terminal, parameter information of a second wireless network to which the terminal is currently connected, to the multimedia playback device through the first wireless network; and connecting the multimedia playback device to the second wireless network according to the received parameter information of the second wireless network.

Another aspect of the present disclosure also provides a method for network initialization of a multimedia playback device. The method includes switching the multimedia playback device to an operating mode of a wireless access point, and sending a wireless signal of the a wireless network, to allow a terminal to screen the wireless access point to which the multimedia playback device connects; receiving, by the multimedia playback device, parameter information of a second wireless network to which the terminal connects, from the terminal; the parameter information of the second wireless network being sent to the multimedia playback device through the first wireless network after the terminal screens the wireless access point of the multimedia playback device and is connected to the first wireless network; and connecting the multimedia playback device to the second wireless network according to the parameter information of the second wireless network.

Another aspect of the present disclosure provides a terminal for network initialization of a multimedia playback device. The terminal includes a screening module, configured to screen a wireless access point of the multimedia playback device; a connection module, configured to connect to a first wireless network of the wireless access point of the multimedia playback device; and a sending module, configured to send parameter information of a second wireless network to which the terminal connects, to the multimedia playback device through the first wireless network, to allow the multimedia playback device to be connected to the second wireless network according to the parameter information of the second wireless network.

Another aspect of the present disclosure provides a multimedia playback device. The device includes a switching module, configured to switch to an operating mode of a wireless access point, and send out a wireless signal of a first wireless network, to allow a terminal to screen the wireless access point connecting to the multimedia playback device; a receiving module, configured to receive parameter information of a second wireless network connected to the terminal, from the terminal; the parameter information of the second wireless network being sent through the first wireless network after the terminal screens the wireless access point of the multimedia playback device and is connected to the first wireless network; and a connection module, configured to connect to the second wireless network according to the parameter information of the second wireless network.

Another aspect of the present disclosure provides a system for network initialization of a multimedia playback device, including a terminal and the multimedia playback device. The terminal includes a screening module, configured to screen a wireless access point of the multimedia playback device; a connection module, configured to connect to a first wireless network of the wireless access point of the multimedia playback device; and a sending module, configured to send parameter information of a second wireless network to which the terminal connects, to the multimedia playback device through the first wireless network, to allow the multimedia playback device to be connected to the second wireless network according to the parameter information of the second wireless network. The multimedia playback device includes a switching module, configured to switch to an operating mode of a wireless access point, and send out a wireless signal of a first wireless network, to allow a terminal to screen the wireless access point connecting to the multimedia playback device; a receiving module, configured to receive parameter information of a second wireless network connected to the terminal, from the terminal; the parameter information of the second wireless network being sent through the first wireless network after the terminal screens the wireless access point of the multimedia playback device and is connected to the first wireless network; and a connection module, configured to connect to the second wireless network according to the parameter information of the second wireless network.

The method for network initialization of a multimedia playback device according to the embodiments of the present disclosure does not need to download a specific application to perform multistep network initialization nor needs to input a series of IP addresses through a network browser and make complicated settings to perform network initialization. The implementation of the process of the network initialization according to the embodiments of the present disclosure is simple, convenient to use. Embodiments of the present disclosure improve the efficiency of the network initialization process.

BRIEF DESCRIPTION OF THE DRAWINGS

To describe the technical solutions of the embodiments of the present disclosure more clearly, the following briefly introduces the accompanying drawings required for describing the embodiments. The accompanying drawings in the following description show only some embodiments of the present disclosure, and a person of ordinary skill in the art may derive other embodiments based on these accompanying drawings.

FIG. 4(a)-FIG. 4(e) are state diagrams of a network initialization process performed according to an embodiment of the present disclosure;

DESCRIPTION OF EMBODIMENTS

In order to make the objectives, technical solutions and advantages of the present disclosure clearer, implementation manners of the present disclosure are further described below in detail with reference to the accompanying drawings.

Figure 1:
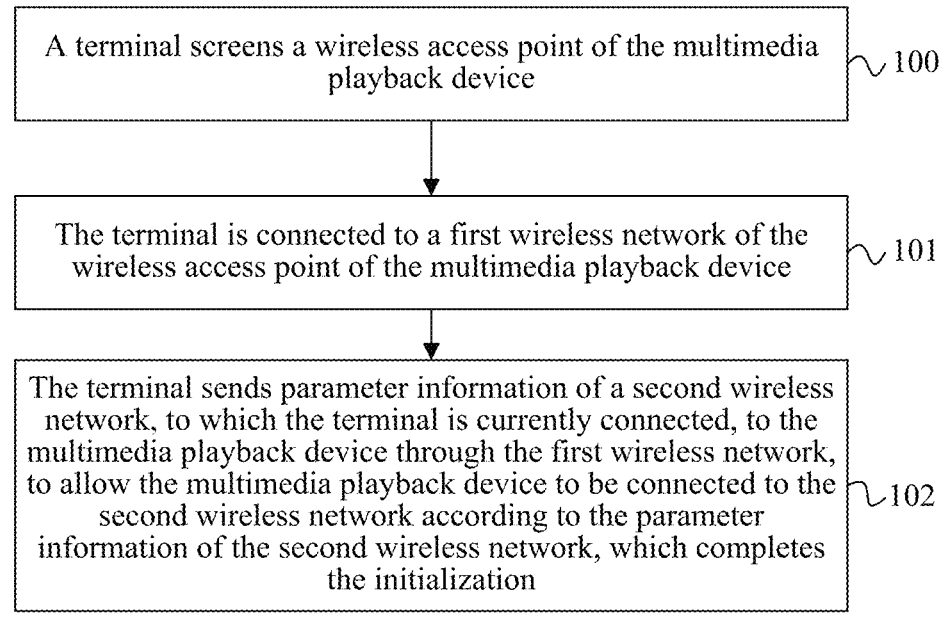
FIG. 1 is a flowchart of a method for network initialization of a multimedia playback device according to one embodiment of the present disclosure.

FIG. 1 is a flowchart of a method for network initialization of a multimedia playback device according to one embodiment of the present disclosure. As shown in FIG. 1, the method for network initialization of a multimedia playback device according to this embodiment may include the following steps.

100. A terminal screens a wireless access point of the multimedia playback device.

The terminal in this embodiment may be a mobile terminal such as a mobile phone or a tablet PC, and so on, and an application similar to a QPlay multimedia playback software can be installed on the terminal. The multimedia playback device in this embodiment may be a wireless smart speaker, a smart TV, or other wireless multimedia playback devices. Such a multimedia playback device has a wireless module, and when the multimedia playback device switches to an operating mode of a WiFi Access Point, a wireless signal can be sent out. The terminal can detect and screen the multimedia playback device according to the wireless signal sent out by the multimedia playback device.

101. The terminal is connected to a first wireless network with the wireless access point associated with the multimedia playback device.

In this embodiment, a wireless network formed by the wireless signal sent out by the wireless access point of the multimedia playback device is called the first wireless network.

102. The terminal sends parameter information of a second wireless network, to which the terminal connects, to the multimedia playback device through the first wireless network. This allows the multimedia playback device to be connected to the second wireless network according to the parameter information of the second wireless network, so as to complete the network initialization process.

According to the method for network initialization of a multimedia playback device in this embodiment, a terminal, by screening a wireless access point of the multimedia playback device, is connected to a first wireless network with the wireless access point associated with the multimedia playback device. The terminal sends parameter information of a second wireless network, to which the terminal connects, to the multimedia playback device through the first wireless network. This allows the multimedia playback device to be connected to the second wireless network according to the parameter information of the second wireless network, so as to complete initialization.

Compared with the existing technology, the method for network initialization of a multimedia playback device according to the embodiments of the present disclosure does not require downloading a specific application to perform multistep network initialization nor inputting a series of IP addresses through a network browser and making complicated settings to perform network initialization process. Implementation of the process of the network initialization according to the present embodiment is simple, convenient to use, and highly efficient.

Optionally, on the basis of the technical solution of the embodiments shown in FIG. 1, step 100, "the terminal is connected to a first wireless network of the wireless access point of the multimedia playback device," may include screening, by the terminal, the wireless access point of the multimedia playback device from multiple wireless access points according to a naming rule of a service set identifier (SSID) or a custom protocol field of the wireless access point of the multimedia playback device.

The naming rule of the SSID stipulates that, the naming manner of the multimedia playback device such as wireless smart speakers is different from that of the ordinary WiFi addresses, and thus the terminal can identify all WiFi addresses according to the naming rule of the SSID, so as to be distinguished from the naming of the ordinary WiFi addresses. Therefore, the terminal can identify all WiFi addresses according to a custom protocol field, so as to screen the WiFi Access Point of the multimedia playback device.

Further, the parameter information of the second wireless network in the foregoing embodiment may include an SSID, a password, an encryption method, and an authentication method of the second wireless network. Specifically, reference can be made to the related existing technology for the encryption method and the authentication method, which are not repeated herein.

Further, based on the technical solution of the embodiment shown in FIG. 1, before step 102, "the terminal sends parameter information of a second wireless network, to which the terminal connects, to the multimedia playback device through the first wireless network, the following steps may also be included.

(1) The terminal prompts a user to input the password of the second wireless network. Specifically, in an implementation process, the terminal may pop up a dialog box to prompt the user to input the password of the second wireless network to which the terminal connects.

(2) The terminal receives the password of the second wireless network input from the user through a human-machine interface module.

Compared with the existing technology, the method for network initialization of a multimedia playback device according to the foregoing embodiment neither needs to download a specific application to perform multistep network initialization nor needs to input a series of IP addresses through a network browser and make complicated set-ups to perform network initialization. Implementation of the process of the network initialization according to the foregoing embodiment is simple, convenient to use, and highly efficient.

Figure 2:
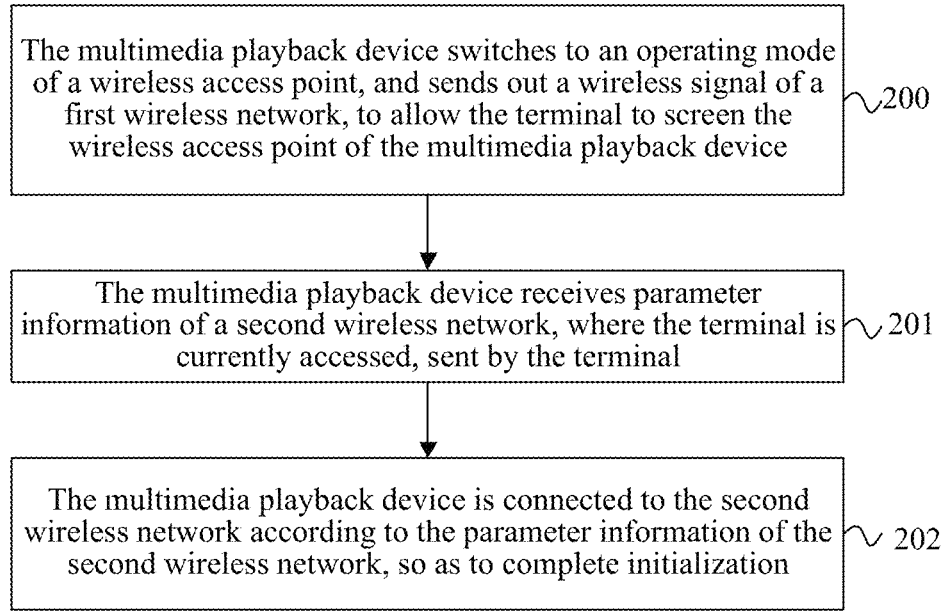
FIG. 2 is a flowchart of a method for network initialization of a multimedia playback device according to another embodiment of the present disclosure.

FIG. 2 is a flowchart of a method for network initialization of a multimedia playback device according to another embodiment of the present disclosure. As shown in FIG. 2, the method for network initialization of a multimedia playback device according to this embodiment may specifically include the following steps.

200. The multimedia playback device switches to an operating mode of a wireless access point, and sends out a wireless signal of a first wireless network, which allows the terminal to screen the wireless access point of the multimedia playback device.

201. The multimedia playback device receives parameter information of a second wireless network, to which the terminal connects, sent by the terminal.

The parameter information of the second wireless network in this embodiment is sent to the multimedia playback device through the first wireless network after the terminal screens the wireless access point of the multimedia playback device and is connected to the first wireless network.

202. The multimedia playback device is connected to the second wireless network according to the parameter information of the second wireless network. This completes the initialization process.

A difference between the method for network initialization of a multimedia playback device according to this embodiment and the embodiment shown in FIG. 1 is that this embodiment describes the technical solution of the present disclosure at the side of the multimedia playback device, while the embodiment shown in FIG. 1 describes the technical solution of the present disclosure at the side of the terminal. Reference can be made to the description about the embodiment shown in FIG. 1 for details of network initialization with the method for network initialization of a multimedia playback device according to this embodiment, which is not repeated herein.

According to the method for network initialization of a multimedia playback device in this embodiment, the multimedia playback device switches to an operating mode of a wireless access point, and sends out a wireless signal of a first wireless network, to allow the terminal to screen the wireless access point of the multimedia playback device. The playback device receives parameter information of a second wireless network, to which the terminal connects, sent by the terminal. The parameter information of the second wireless network is sent to the multimedia playback device through the first wireless network after the terminal screens the wireless access point of the multimedia playback device and is connected to the first wireless network. The playback device is connected to the second wireless network according to the parameter information of the second wireless network, which completes the initialization process. The method for network initialization of a multimedia playback device according to this embodiment neither needs to download a specific application to perform multistep network initialization nor needs to input a series of IP addresses through a network browser and make complicated settings to perform network initialization. Implementation of the process of the network initialization according to this embodiment is simple, convenient to use, and highly efficient.

The parameter information of the second wireless network in the foregoing embodiments includes an SSID, a password, an encryption method and an authentication method of the second wireless network. Reference can also be made to the description about the embodiment shown in FIG. 1 for details, which is not repeated herein.

Figure 3:
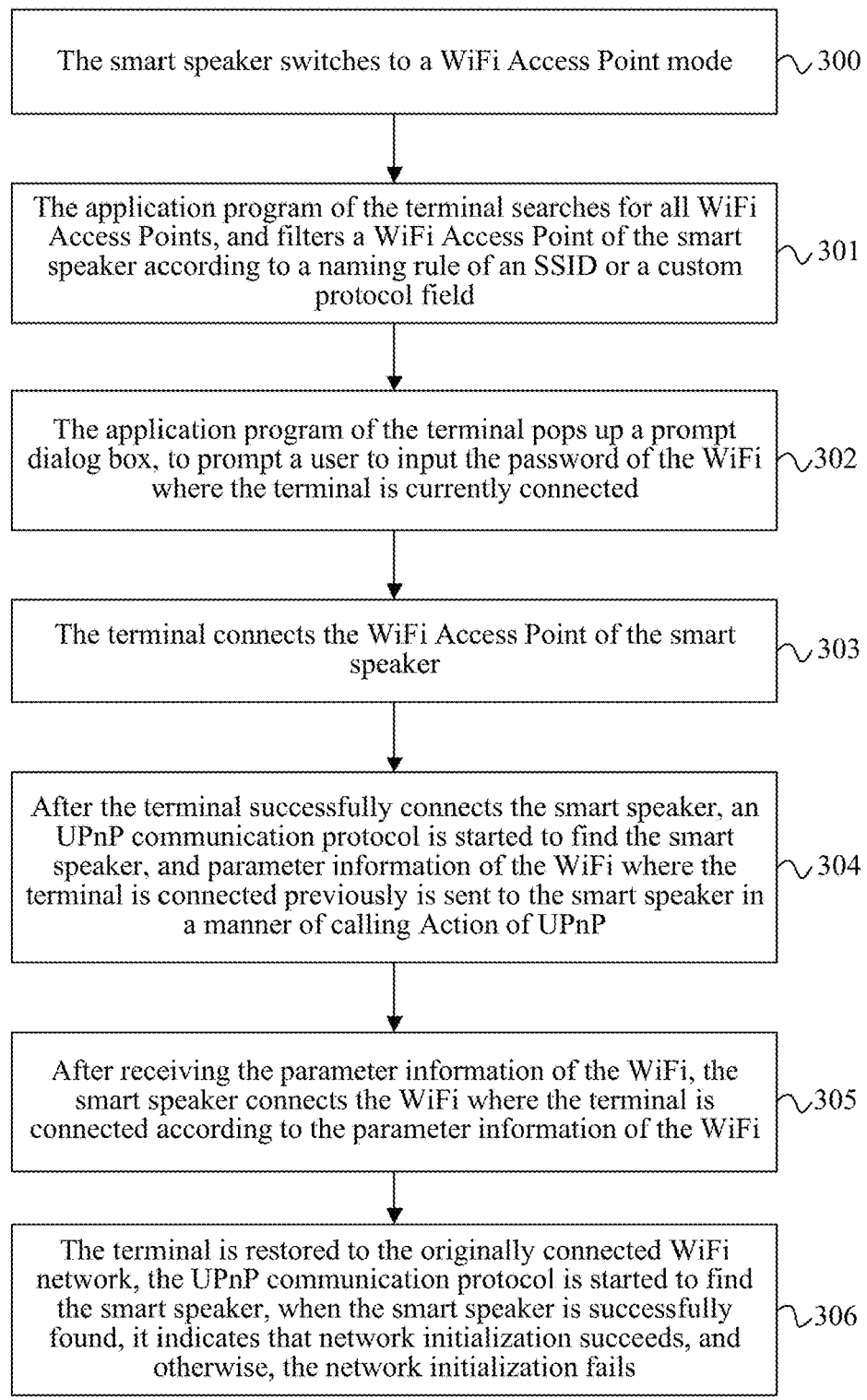
FIG. 3 is a flowchart of a method for network initialization of a multimedia playback device according to a further embodiment of the present disclosure.

FIG. 3 is a flowchart of a method for network initialization of a multimedia playback device according to a further embodiment of the present disclosure. As shown in FIG. 3, in the method for network initialization of a multimedia playback device according this embodiment, the technical solution of the present disclosure is described by taking that the multimedia playback device is a smart speaker and operations of the terminal are specifically operations of an application program (e.g., QQ music) in the terminal as an example, and the method for network initialization of a multimedia playback device according this embodiment may specifically include the following steps:

300. The smart speaker switches to a WiFi Access Point mode.

301. The application program of the terminal searches for all WiFi Access Points, and filters a WiFi Access Point of the smart speaker according to a naming rule of an SSID or a custom protocol field.

302. The application program of the terminal pops up a prompt dialog box, to prompt a user to input the password of the WiFi to which the terminal connects.

303. The terminal connects the WiFi Access Point of the smart speaker.

304. After the terminal successfully connects the smart speaker, an UPnP communication protocol is started to find the smart speaker, and parameter information of the WiFi to which the terminal connects previously is sent to the smart speaker in a manner of calling Action of UPnP.

The parameter information of the WiFi to which the terminal connects in this embodiment includes an SSID, a password, an encryption method and an authentication method of the WiFi to which the terminal connects. Reference can be made to the related existing technology for details, which is not repeated herein.

305. After receiving the parameter information of the WiFi, the smart speaker connects the WiFi to which the terminal connects according to the parameter information of the WiFi.

306. The terminal is restored to the originally connected WiFi network, the UPnP communication protocol is started to find the smart speaker, when the smart speaker is successfully found, it indicates that network initialization succeeds, and otherwise, the network initialization fails.

It should be noted that, when the network initialization fails, network initialization may be re-performed from step 300.

The method for network initialization of a multimedia playback device according to this embodiment neither needs to download a specific application to perform multistep network initialization nor needs to input a series of IP addresses through a network browser and make complicated settings to perform network initialization. Implementation of the process of the network initialization according to this embodiment is simple, convenient to use, and highly efficient.

The detailed implementation solution of the present disclosure is described below. For example, the application program in the terminal is QQ music and the multimedia playback device is a QPlay device (e.g., specifically a smart speaker).

Figures 4D, 4E:
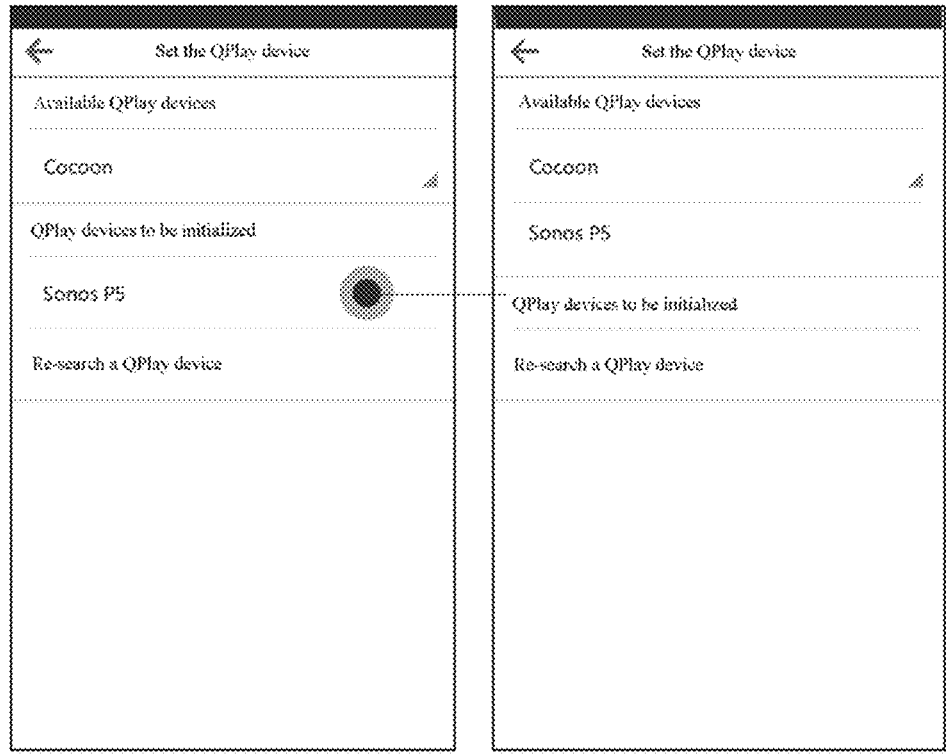

FIG. 4(a)-FIG. 4(e) are state diagrams of network initialization performed with the method for network initialization of a multimedia playback device according to an embodiment of the present disclosure. As shown in FIG. 4(a)-FIG. 4(e), when the smart speaker is in a hotspot state, if a user enters QQmusic and selects the multimedia playback (e.g., QPlay) device, the QQmusic will automatically search for QPlay devices, and divide the devices into two types, i.e., "available" and "to be initialized" (as shown in FIG. 4(c)-FIG. 4(e)). For the QPlay devices to be initialized, the search result is displayed in "QPlay devices to be initialized." As shown in FIG. 4(a) and FIG. 4(b), after a QPlay device to be initialized is clicked, the user only needs to input the WiFi password of the current mobile phone. For example, in FIG. 4(b), the WiFi of the current mobile phone is Tencent Free WiFi. The password of the Tencent Free WiFi is the input. After the password is entered, the application program in the terminal automatically completes the remaining initialization process, that is, sends parameter information of the WiFi to the smart speaker, to allow the smart speaker to access the WiFi according to the received parameter information of the WiFi. When the application program QQmusic in the terminal can find the smart speaker, the network initialization is completed, and the smart speaker that completes the initialization will be displayed in a list of available QPlay devices. According to the solution of the embodiment of the present disclosure, the QQmusic can automatically complete speaker settings, complicated steps are not needed. Lightweight/easy initialization settings of the wireless smart speaker which can be completed through one step is thus provided to the user.

As shown in FIG. 4(a) and FIG. 4(e), when the second and following more QPlay devices are set in the current initialization process, it is only necessary to select a device to be initialized, it is not necessary to input the password once again. QPlay initialization process may automatically complete the WiFi information transmission and other subsequent setting processes. The QPlay initialization process may remember the WiFi password of the current mobile phone when entering the process of "setting QPlay devices" in the current time, to reduce the user's input and operation steps.

Implementation of the process of the network initialization process according to the foregoing embodiment is simple, convenient to use, and highly efficient.

Figure 5:
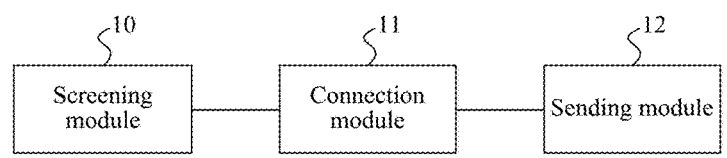
FIG. 5 is a schematic structural diagram of a terminal according to an embodiment of the present disclosure.

FIG. 5 is a schematic structural diagram of a terminal according to an embodiment of the present disclosure. As shown in FIG. 5, the terminal of this embodiment may specifically include a screening module 10, a connection module 11 and a sending module 12.

The screening module 10 is configured to screen a wireless access point of the multimedia playback device. The connection module 11 is connected with the screening module 10. The connection module 11 is configured to connect a terminal to a first wireless network of the wireless access point of the multimedia playback device screened by the screening module 10. The sending module 12 is connected with the connection module 11. The sending module is configured to send parameter information of a second wireless network, to which the terminal connects, to the multimedia playback device through the first wireless network to which the connection module 11 is connected, to allow the multimedia playback device to be connected to the second wireless network according to the parameter information of the second wireless network, so as to complete initialization.

The implementation mechanism through which the terminal of this embodiment achieves network initialization of the multimedia playback device by using the modules is the same as that in the related method embodiment, and reference can also be made to the description about the foregoing embodiment for details, which is not repeated herein.

The terminal of this embodiment, by screening a wireless access point of the multimedia playback device, is connected to a first wireless network of the wireless access point of the multimedia playback device; and sends parameter information of a second wireless network, to which the terminal connects, to the multimedia playback device through the first wireless network, to allow the multimedia playback device to be connected to the second wireless network according to the parameter information of the second wireless network, so as to complete initialization process.

The method for network initialization of a multimedia playback device according to this embodiment neither needs to download a specific application to perform multistep network initialization nor needs to input a series of IP addresses through a network browser and make complicated settings to perform network initialization. Implementation of the process of the network initialization according to this embodiment is simple, convenient to use, and highly efficient.

Optionally, based on the technical solution of the embodiment shown in FIG. 5, the screening module 10 is specifically configured to screen the wireless access point of the multimedia playback device from multiple wireless access points according to a naming rule of an SSID or custom protocol field of the wireless access point of the multimedia playback device.

Optionally, based on the technical solution of the embodiment shown in FIG. 5, the parameter information of the second wireless network includes an SSID, a password, an encryption method, and an authentication method of the second wireless network.

Optionally, on the basis of the technical solution of the embodiment shown in FIG. 5, the terminal may further include a prompting module, configured to, before the sending module sends parameter information of a second wireless network to which the terminal connects, to the multimedia playback device through the first wireless network, prompt a user to input the password of the second wireless network. The terminal may include a receiving module, configured to receive the password of the second wireless network input by the user through a human-machine interface module.

According to the method for network initialization of a multimedia playback device of the foregoing embodiment, compared with the existing technology, the method for network initialization of a multimedia playback device according to this embodiment neither needs to download a specific application to perform multistep network initialization nor needs to input a series of IP addresses through a network browser and make complicated settings to perform network initialization. Implementation of the process of the network initialization according to this embodiment is simple, convenient to use, and highly efficient.

Figure 6:
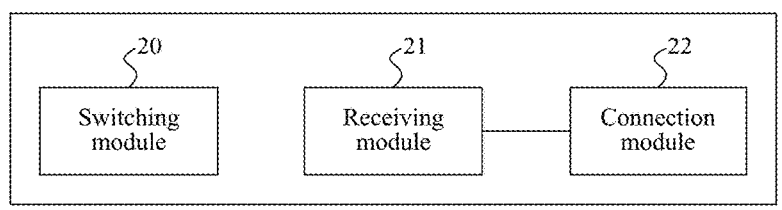
FIG. 6 is a schematic structural diagram of a multimedia playback device according to an embodiment of the present disclosure.

FIG. 6 is a schematic structural diagram of a multimedia playback device according to an embodiment of the present disclosure. As shown in FIG. 6, the multimedia playback device according to this embodiment may specifically include a switching module 20, a receiving module 21 and a connection module 22.

In the multimedia playback device according to this embodiment, the switching module 20 is configured to switch to an operating mode of a wireless access point, and send out a wireless signal of a first wireless network, to allow the terminal to screen the wireless access point of the multimedia playback device. In one example, the switching module 20 may include a processor, a communication chip, a memory, and computer program instructions stored in the memory. The communications unit may be a network communications device, such as a radio frequency (RF) circuit, a router, or a modem. The processor is the control center of the multimedia playback device, and is connected to various parts of the device by using various interfaces and lines. By running or executing the software program and/or module stored in the memory, and invoking data stored in the memory, the processor performs various functions and data processing of the playback device, thereby performing switching operating mode, sending out wireless signals, screening wireless access points, and other functions.

The receiving module 21 is configured to receive parameter information of a second wireless network, to which the terminal connects, sent by the terminal. The parameter information of the second wireless network being sent to the multimedia playback device through the first wireless network after the terminal screens the wireless access point of the multimedia playback device and is connected to the first wireless network. In one example, the receiving module 21 may include a processor, a communication chip, a memory, and computer program instructions stored in the memory. By running or executing the software program and/or module stored in the memory, and invoking data stored in the memory, the processor performs various functions and data processing of the playback device, thereby implementing data receiving functions, and other functions.

The connection module 22 is connected with the receiving module 21. The connection module 22 is configured to connect to the second wireless network according to the parameter information of the second wireless network, so as to complete the initialization. In one example, the connection module 22 may include a processor, a communication chip, a memory, and computer program instructions stored in the memory. By running or executing the software program and/or module stored in the memory, and invoking data stored in the memory, the processor performs various functions and data processing of the playback device, thereby implementing network connecting functions, and other functions.

Optionally, the parameter information of the second wireless network in the foregoing embodiment may include an SSID, a password, an encryption method, and an authentication method of the second wireless network.

According to the multimedia playback device in this embodiment, the multimedia playback device switches to an operating mode of a wireless access point, and sends out a wireless signal of a first wireless network, to allow the terminal to screen the wireless access point of the multimedia playback device. The multimedia playback device receives parameter information of a second wireless network, to which the terminal connects, sent by the terminal. The parameter information of the second wireless network is sent to the multimedia playback device through the first wireless network after the terminal screens the wireless access point of the multimedia playback device and is connected to the first wireless network; and is connected to the second wireless network according to the parameter information of the second wireless network. This completes the initialization process. The multimedia playback device according to this embodiment neither needs to download a specific application to perform multistep network initialization nor needs to input a series of IP addresses through a network browser and make complicated settings to perform network initialization. Implementation of the process of the network initialization according to this embodiment is simple, convenient to use, and highly efficient.

It should be noted that, an embodiment of the present disclosure further provides a system for network initialization of a multimedia playback device, the system including the terminal of the embodiment as shown in FIG. 5 and the multimedia playback device of the embodiment as shown in FIG. 6. Specifically, network initialization can be achieved by using the method for network initialization of a multimedia playback device of the embodiment as shown in FIG. 1 to FIG. 4; reference can be made to the description about the foregoing embodiment for details, which is not repeated herein.

Figure 7:
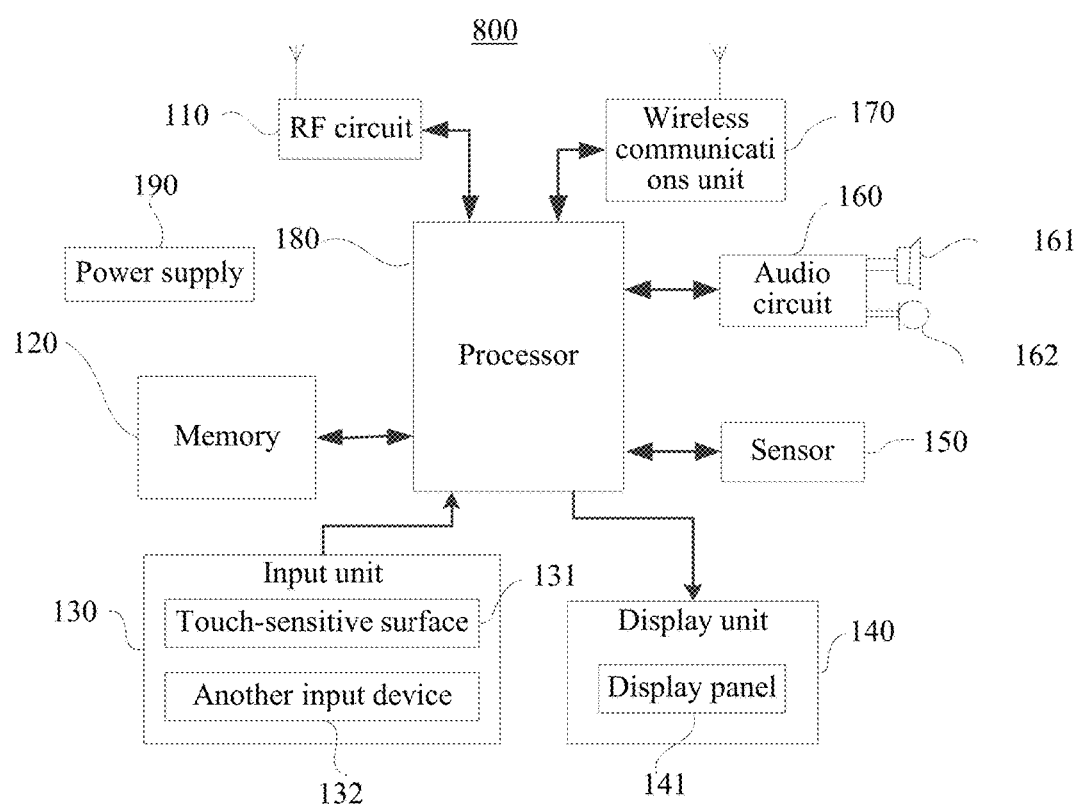
FIG. 7 is a schematic structural diagram of a terminal device according to an embodiment of the present disclosure.

FIG. 7 is a schematic structural diagram of a terminal device according to an embodiment of the present disclosure. Referring to FIG. 7, the terminal device may be configured to implement the methods for network initialization of a multimedia playback device according to the foregoing embodiments.

The terminal device 800 may include components such as a communications unit 110, a memory 120 including one or more computer readable storage media, an input unit 130, a display unit 140, a sensor 150, an audio circuit 160, a WiFi (wireless fidelity) module 170, a processor 180 including one or more processing cores, and a power supply 190. A person skilled in the art may understand that the structure of the terminal device shown in FIG. 7 does not constitute a limitation to the terminal device, and the terminal device may include more components or fewer components than those shown in the figure, or some components may be combined, or a different component deployment may be used.

The communications unit 110 may be configured to receive and send signals during an information receiving and sending process or a call process. The communications unit 110 may be a network communications device, such as a radio frequency (RF) circuit, a router, or a modem. Particularly, when the communications unit 110 is the RF circuit, the communications unit receives downlink information from a base station, then delivers the downlink information to one or more processors 180 for processing, and sends related uplink data to the base station. Generally, the RF circuit serving as the communications unit includes, but is not limited to, an antenna, at least one amplifier, a tuner, one or more oscillators, a subscriber identity module (SIM) card, a transceiver, a coupler, a low noise amplifier (LNA), and a duplexer. In addition, the communications unit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal device 800, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal device 800. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 7, the touch-sensitive surface 131 and the display panel 141 are used as two separate parts to implement input and output functions, in some embodiments, the touch-sensitive surface 131 and the display panel 141 may be integrated to implement the input and output functions.

The terminal device 800 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal device 800 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal device 800, are not further described herein.

The audio circuit 160, a loudspeaker 161, and a microphone 162 may provide audio interfaces between the user and the terminal device 800. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communications between a peripheral earphone and the terminal device 800.

To enable wireless communication, the terminal device may be configured with a wireless communications unit 170. The wireless communications unit 170 may be a WiFi module. WiFi is a short distance wireless transmission technology. The terminal device 800 may help, by using the wireless communications unit 170, the user to receive and send e-mails, browse a webpage, access streaming media, and so on, which provides wireless broadband Internet access for the user. Although FIG. 7 shows the wireless communications unit 170, it may be understood that the wireless communications unit is not a necessary component of the terminal device 800, and when required, the wireless communications unit may be omitted as long as the scope of the essence of the present disclosure is not changed.

The processor 180 is the control center of the terminal device 800, and is connected to various parts of the mobile phone by using various interfaces and lines. By running or executing the software program and/or module stored in the memory 120, and invoking data stored in the memory 120, the processor 180 performs various functions and data processing of the terminal device 800, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal device 800 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal device 800 may further include a camera, a Bluetooth module, and the like, which are not explicitly described herein. Specifically, in this embodiment, the display unit of the terminal device is a touch screen display, and the terminal device further includes a memory and one or more programs. The one or more programs are stored in the memory and configured to be executed by one or more processors. The one or more programs contain instructions used for implementing the following operations: screening a wireless access point of the multimedia playback device; connecting the terminal to a first wireless network of the wireless access point of the multimedia playback device; and sending parameter information of a second wireless network, to which the terminal connects, to the multimedia playback device through the first wireless network, to allow the multimedia playback device to be connected to the second wireless network according to the parameter information of the second wireless network, so as to complete initialization.

Optionally, the memory is further configured to store the following instructions: screening the wireless access point of the multimedia playback device from multiple wireless access points according to a naming rule of an SSID or a custom protocol field of the wireless access point of the multimedia playback device.

Optionally, the memory is further configured to store the following instructions: the parameter information of the second wireless network includes an SSID, a password, an encryption method and an authentication method of the second wireless network.

Optionally, the memory is further configured to store the following instructions: before the sending, by the terminal, parameter information of a second wireless network, to which the terminal connects, to the multimedia playback device through the first wireless network. The method further includes prompting, by the terminal, a user to input the password of the second wireless network; and receiving, by the terminal, the password of the second wireless network input by the user through a human-machine interface module.

The terminal device may further be configured to execute another method for network initialization of a multimedia playback device. Correspondingly, the memory is configured to store the following instructions: switching to an operating mode of a wireless access point, and sending out a wireless signal of a first wireless network, to allow the terminal to screen the wireless access point of the multimedia playback device; receiving parameter information of a second wireless network, to which the terminal connects, sent by the terminal. The parameter information of the second wireless network being sent to the multimedia playback device through the first wireless network after the terminal screens the wireless access point of the multimedia playback device and is connected to the first wireless network. The memory is further configured to store the following instructions: connecting to the second wireless network according to the parameter information of the second wireless network, so as to complete initialization.

Optionally, the memory is further configured to store the following instructions: the parameter information of the second wireless network includes an SSID, a password, an encryption method and an authentication method of the second wireless network.

In one example, as shown in FIG. 5, the screening module 10 may include a part of processor 180, memory 120, wireless communication unit 170, RF circuit 110, which can be implement the functions of screening wireless access point as describe herewith. The connection module 11 may include a part of processor 180, memory 120, wireless communication unit 170, RF circuit 110, which can connect a terminal to a first wireless network of the wireless access point of the multimedia playback device screened by the screening module 10. The sending module 12 may include a part of processor 180, memory 120, wireless communication unit 170, RF circuit 110, which implements the functions of sending parameter information of a second wireless network to the multimedia playback device through the first wireless network. Other components, such as display unit 140, input unit 130, may be added to the screen module 10, the connection module 11, and the sending module 12 depending on the specific function of the embodiments.

It should be noted that division of the above functional modules is only described for exemplary purposes when the multimedia playback device and the terminal provided in the foregoing embodiments perform network initialization. In actual applications, the functions may be allocated to different functional modules according to specific needs, which means that the internal structure of the multimedia playback device and the terminal may be divided to different functional modules to complete all or some of the above described functions. In addition, the solutions of network initialization of a multimedia playback device provided by the foregoing embodiments are based on the same concept as the method embodiments of the method network initialization of a multimedia playback device. Reference can be made to the method embodiments for the specific implementation process, which is not repeated herein.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for network initialization of a multimedia playback device, the method comprising:
    screening, by an application program stored in a terminal, a wireless access point of the multimedia playback device;
    connecting the terminal to a first wireless network formed by the wireless access point of the multimedia playback device;
    sending, by the application program stored in the terminal, parameter information of a second wireless network to which the terminal is currently connected, to the multimedia playback device through the first wireless network formed by the wireless access point of the multimedia playback device; and
    connecting the multimedia playback device to the second wireless network according to the received parameter information of the second wireless network, wherein:
    the application program comprises a user interface, after screening the wireless access point of the multimedia playback device, the user interface displays the multimedia playback device as an "available" or a "to be initialized" type;
    when selecting the "to be initialized" type through the user interface, the user is prompted by the user interface to input the parameter information of the second wireless network.

2. The method according to claim 1, screening, by the application program stored in the terminal, the wireless access point of the multimedia playback device further comprising:
    screening, by the application program stored in the terminal, the wireless access point of the multimedia playback device from multiple wireless access points based on a naming rule of a service set identifier (SSID) or a custom protocol field of the wireless access point of the multimedia playback device.

3. The method according to claim 1, wherein the parameter information of the second wireless network comprises an SSID, a password, an encryption method, and an authentication method of the second wireless network.

4. The method according to claim 3, the method further comprising:
    prompting, by the application program stored in the terminal, a user to input the password of the second wireless network; and
    receiving, by the terminal, the password of the second wireless network inputted by the user through a human-machine interface module.

5. The method according to claim 1, wherein when selecting the "available" type through the user interface, the application program displays a list of all available devices on the user interface.

6. A method for network initialization of a multimedia playback device, the method comprising:
    switching the multimedia playback device to an operating mode of a wireless access point, and sending a wireless signal of a wireless network, to allow an application program stored in a terminal to screen the wireless access point to which the multimedia playback device connects;
    receiving, by the multimedia playback device, parameter information of a second wireless network to which the terminal connects, from the application program stored in the terminal; the parameter information of the second wireless network being sent to the multimedia playback device through the first wireless network after the application program stored in the terminal screens the wireless access point of the multimedia playback device and is connected to the first wireless network; and
    connecting the multimedia playback device to the second wireless network according to the parameter information of the second wireless network, wherein:
    the application program comprises a user interface, after screening the wireless access point of the multimedia playback device, the user interface displays the multimedia playback device as an "available" or a "to be initialized" type;
    when selecting the "to be initialized" type through the user interface, the user is prompted by the user interface to input the parameter information of the second wireless network.

7. The method according to claim 6, wherein the parameter information of the second wireless network comprises a service set identifier (SSID), a password, an encryption method, and an authentication method of the second wireless network.

8. A terminal for network initialization of a multimedia playback device, comprising:
    a processor;
    a memory coupled to the processor;
    a plurality of program modules stored in the memory to be executed by the processor, the plurality of program modules comprising:
        a screening module, configured to screen a wireless access point of the multimedia playback device by using an application program stored in the terminal;
        a connection module, configured to connect the terminal to a first wireless network of the wireless access point of the multimedia playback device by using the application program stored in the terminal; and
        a sending module, configured to send parameter information of a second wireless network to which the terminal connects, to the multimedia playback device through the first wireless network by using an application program stored in the terminal, to allow the multimedia playback device to be connected to the second wireless network according to the parameter information of the second wireless network, wherein:
    the application program comprises a user interface, after screening the wireless access point of the multimedia playback device, the user interface displays the multimedia playback device as an "available" or a "to be initialized" type;
when selecting the "to be initialized" type through the user interface, the user is prompted by the user interface to input the parameter information of the second wireless network.

9. The terminal according to claim 8, wherein the screening module is specifically configured to screen the wireless access point of the multimedia playback device from multiple wireless access points according to a naming rule of a service set identifier (SSID) or custom protocol field of the wireless access point of the multimedia playback device.

10. The terminal according to claim 8, wherein the parameter information of the second wireless network comprises a service set identifier (SSID), a password, an encryption method, and an authentication method of the second wireless network.

11. The terminal according to claim 10, further comprising:
a prompting module, configured to prompt a user to input the password of the second wireless network by using the application program stored in the terminal; and
a receiving module, configured to receive the password of the second wireless network inputted by the user through a human-machine interface module.

12. A multimedia playback device, comprising:
a processor;
a memory coupled to the processor;
a plurality of program modules stored in the memory to be executed by the processor, the plurality of program modules comprising:
a switching module, configured to switch to an operating mode of a wireless access point, and send out a wireless signal of a first wireless network, to allow an application program stored in a terminal to screen the wireless access point connecting to the multimedia playback device;
a receiving module, configured to receive parameter information of a second wireless network connected to the terminal, from the application program stored in the terminal; the parameter information of the second wireless network being sent through the first wireless network after the application program stored in the terminal screens the wireless access point of the multimedia playback device and is connected to the first wireless network; and
a connection module, configured to connect to the second wireless network according to the parameter information of the second wireless network, wherein:
the application program comprises a user interface, after screening the wireless access point of the multimedia playback device, the user interface displays the multimedia playback device as an "available" or a "to be initialized" type;
when selecting the "to be initialized" type through the user interface, the user is prompted by the user interface to input the parameter information of the second wireless network.

13. The device according to claim 12, wherein the parameter information of the second wireless network comprises a service set identifier (SSID), a password, an encryption method, and an authentication method of the second wireless network.

14. A system for network initialization of a multimedia playback device, including a terminal and the multimedia playback device, the terminal comprising:
a first processor;
a first memory coupled to the first processor;
a plurality of first program modules stored in the first memory to be executed by the first processor, the plurality of first program modules comprising:
a screening module, configured to screen a wireless access point of the multimedia playback device by using an application program stored in the terminal;
a connection module, configured to connect the terminal to a first wireless network of the wireless access point of the multimedia playback device by using the application program stored in the terminal; and
a sending module, configured to send parameter information of a second wireless network to which the terminal connects, to the multimedia playback device through the first wireless network by using the application program stored in the terminal, to allow the multimedia playback device to be connected to the second wireless network according to the parameter information of the second wireless network;
the multimedia playback device, comprising:
a second processor;
a second memory coupled to the second processor;
a plurality of second program modules stored in the second memory to be executed by the second processor, the plurality of second program modules comprising:
a switching module, configured to switch to an operating mode of a wireless access point, and send out a wireless signal of a first wireless network, to allow the application program stored in the terminal to screen the wireless access point connecting to the multimedia playback device;
a receiving module, configured to receive parameter information of a second wireless network connected to the terminal, from the application program stored in the terminal; the parameter information of the second wireless network being sent through the first wireless network after the application program stored in the terminal screens the wireless access point of the multimedia playback device and is connected to the first wireless network; and
a connection module, configured to connect to the second wireless network according to the parameter information of the second wireless network, wherein:
the application program comprises a user interface, after screening the wireless access point of the multimedia playback device, the user interface displays the multimedia playback device as an "available" or a "to be initialized" type;
when selecting the "to be initialized" type through the user interface, the user is prompted by the user interface to input the parameter information of the second wireless network.

* * * * *